United States Patent

Eckenbrecht

[15] 3,700,795

[45] Oct. 24, 1972

[54] FLYING SPOT SCANNER FOR CONTINUOUSLY ADVANCED FILM

[72] Inventor: Robert Roy Eckenbrecht, East Bethany, N.Y.

[73] Assignee: GTE Sylvania Incorporated

[22] Filed: July 16, 1971

[21] Appl. No.: 163,253

[52] U.S. Cl. ..............................178/7.2, 178/DIG. 28

[51] Int. Cl. ................................................H04n 5/36

[58] Field of Search..............178/5.2 D, DIG. 28, 7.2

[56] References Cited

UNITED STATES PATENTS

| | | | |
|---|---|---|---|
| 2,291,723 | 8/1942 | Jensen | 178/7.2 |
| 2,523,156 | 9/1950 | Somers | 178/DIG. 28 |
| 2,525,891 | 10/1950 | Garman et al. | 178/DIG. 28 |
| 2,786,888 | 3/1957 | Hadfield | 178/DIG. 28 |
| 3,651,254 | 3/1972 | Metzger | 178/DIG. 28 |

*Primary Examiner*—Robert L. Richardson
*Attorney*—Norman J. O'Malley et al.

[57] ABSTRACT

A system for providing a composite color television signal derived from a continuously advancing film of film frames in a flying spot scanner system includes a sync pulse signal generator, encoder, transmitter, horizontal and vertical scan circuitry, film frame detector, and a vertical scan modification signal development means wherein dual ramp signals in analog form are developed and selectively switched in accordance with the positional location of a film frame within a film scanning zone to effect modulation of vertical scanning of the film in accordance with the continuous advancement of the film through the film scanning zone.

8 Claims, 1 Drawing Figure

PATENTED OCT 24 1972 3,700,795
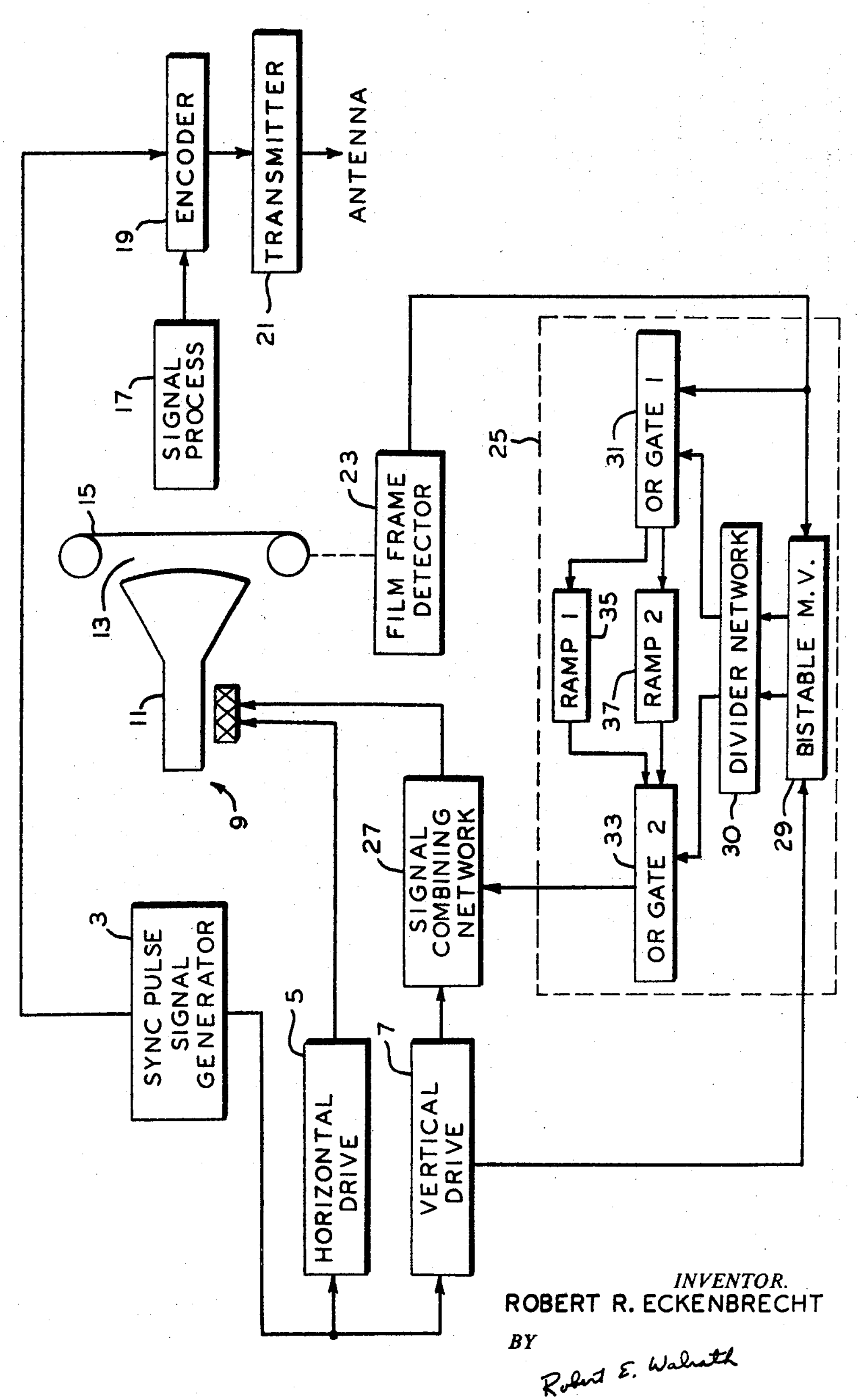
INVENTOR.
ROBERT R. ECKENBRECHT
BY
Robert E. Walrath
ATTORNEY

FLYING SPOT SCANNER FOR CONTINUOUSLY ADVANCED FILM

CROSS-REFERENCE TO OTHER APPLICATIONS

Co-pending applications entitled "Continuous Electronic Film Scanner" filed Feb. 13, 1970 and having Ser. No. 11,065 and now U.S. Pat. No. 3,619,483, and Ser. No. 11,171, and now U.S. Pat. No. 3,621,121, suggest apparatus for modifying vertical scanning of a continuously moving film to effect synchronization with a television signal vertical scanning rate. Also, co-pending application entitled "Variable Speed Continuous Motion Film and Television Scan Synchronization" filed Apr. 15, 1970 and having Ser. No. 28,864 provides a continuously advancing film of film frames and vertical modification signal development means employing dual ramp signals to effect modulated electron beam scanning in accordance with film movement.

BACKGROUND OF THE INVENTION

Generally, film transport systems for deriving synchronized vertical film scanning and color television signals are of either the intermittent or continuous motion type. In the continuous motion type synchronization of vertical scanning of a continuously moving film of film frames and a signal for display on a color television receiver is of major importance.

One known form of apparatus for achieving the above-described synchronization in a continuous motion system employs a modification signal development means wherein a continuously varying ramp signal is combined with a vertical scanning signal having a frequency equal to the vertical scanning frequency of a television signal. The ramp signal varies at a rate substantially equal to the rate of film movement and retrace of both the vertical scan and vertical scan modification signals is achieved during the period of horizontal blanking of the television receiver.

In another known system, Ser. No. 28,864 previously mentioned, synchronization of film and television signal vertical scanning is achieved by a technique wherein dual ramp signals are provided by a vertical scan modification signal development means and selectively switched during the vertical retrace period of the television signal. In this instance, a preferred but not exclusive form of apparatus provides ramp signals in the form of digital logic information which is employed to achieve the above desired film scanning and television signal synchronization.

OBJECTS AND SUMMARY OF THE INVENTION

Therefore, it is an object of the present invention to provide an enhanced system for developing a color television signal derived from a continuously advanced film of film frames. Another object of the invention is to provide vertical scan modification signal development means employing analog developed dual ramp signals. A further object of the invention is to provide enhanced vertical scan modification signal development means employing switching means for initiating and switching analog developed ramp signals to effect synchronized film scanning and television signal development.

These and other objects, advantages and capabilities are achieved in one aspect of the invention by composite color television signal development apparatus employing a sync pulse signal generator, encoder, transmitter, flying spot scanner system wherein film is continuously advanced through a film scanning zone, and a vertical scan modification signal development means wherein a switching means initiates and selects analog developed dual ramp signals in accordance with film frame detector and vertical scan signals to effect modulation of the vertical scanning of the film.

BRIEF DESCRIPTION OF THE DRAWINGS

The sole FIGURE illustrates a composite color television signal development system having analog type vertical scan modification signal development apparatus.

PREFERRED EMBODIMENT OF THE INVENTION

For a better understanding of the present invention, together with other and further objects, advantages and capabilities thereof, reference is made to the following disclosure and appended claims in connection with the above-mentioned drawing.

Referring to the drawing, composite color television signal development apparatus includes a sync pulse signal generator 3 providing activating and synchronizing signals for horizontal activating and synchronizing signals for horizontal drive 5 and vertical drive 7 circuitry of a flying spot scanner system 9. The flying spot scanner system 9 includes a flying spot scanner tube 11 with an adjacent film scanning zone 13 through which a film 15 of film frames is continuously advanced.

A signal processing network 17 provides signals representative of image information derived from the film 15 and applies these signals to a signal encoder 19 which is also coupled and responsive to synchronizing signals from the sync pulse signal generator 3. A transmitter 21 couples signals available from the encoder 19 to an antenna in a manner such that a transmitter composite color television signal derived from film is provided.

Associated with and responsive to the continuously advancing film 15 of film frames is a film frame detector 23. This film frame detector 23, which may be in the form of a film sprocket hole detector, provides a signal representative of a given positional location of a film frame in the film scanning zone 13. Also, the frequency of the signal from the film frame detector 23 is representative of the rate of advancement of a film frame through the film scanning zone 13.

A vertical scan modification signal development means 25 is coupled to the film frame detector 23 and to the vertical drive circuitry 7. This vertical modification signal development means 25 provides a modified vertical scan signal which is applied to a signal combining network 27. In turn, the signal combining network receives a signal from the vertical drive circuit 7 and the modified vertical scan signal development means 25 and provides a combined vertical scan and vertical scan modification signal which is applied to and alters the vertical scanning of the flying spot scanner tube 11 of the flying spot scanner system 9.

More specifically, the vertical modification signal development means 25 preferably includes a switching means 29 such as a bistable multi-vibrator, a divider network 30, first and second OR gates 31 and 33 coupled to the divider network 30 and to the film frame detector 23, and first and second ramp signal development means 35 and 37 coupled intermediate the first and second OR gates 31 and 33. Also, the output signal from the second OR gate 33 is applied to the signal combining network 27.

As to operation, the first and second ramp signal development means 35 and 37 are of the analog type such as the well-known R/C charging circuits wherein a capacitor is charged from a constant current source. Obviously, capacitor-integrator ramp signal circuitry wherein the ramp signals are derived from a tone wheel rotating at the film speed and other well-known analog ramp signal development techniques are equally applicable and appropriate.

The switching means 29 is "readied" in response to a signal from the film frame detector 23 and activated upon receipt of a following signal from the vertical drive circuit 7. Following, the switching means activates the divider network 30. Thereupon, the first OR gate 31 is rendered operational selecting one of the dual ramp signal development means 35 and 37 for initiation of ramp signal development.

At the same time, the second OR gate 33 is activated in a manner substantially similar to the first OR gate 31. Again, the next signal from the film frame detector 23 causes activation of the switching means 29. The second OR gate 32 thereupon selectively applies signals from the other one of the dual ramp signal development means 35 and 37 to the signal combining network 27.

Thus, a signal from the film frame detector 23 representative of a film frame in the film scanning zone 13 "sets-up" the switching means 29. A signal from the vertical drive circuit 7 following the above-mentioned "setting-up" of the switching means 29 causes activation thereof during the period of vertical retrace. Thereupon, a ramp signal generation is initiated in one of the ramp signal development means 35 and 37 and the output ramp signal is selected from the other ramp signal development means 35 and 37. Thus, initiation and selection of the ramp signals is controlled by the signals provided by the film frame detector 23.

Thereafter, the output ramp signal or vertical scan modification signal available from the OR gate 33 of the vertical scan modification signal development means 25 is applied to the signal combining network 27. This signal combining network 27 also receives signals from the vertical drive circuitry 7 and provides a combined vertical scan and vertical scan modification signal whereby the raster or trace appearing on the flying spot scanner tube 11 is vertically modified in accordance with the progress of a film frame through the film scanning zone 13. At the same time, vertical scanning of the above-mentioned raster occurs at the vertical drive frequency utilized in an image display device.

Thus, it should be noted that there has been provided a unique system for developing a composite color television signal from a film of film frames. Herein, a modified vertical drive signal is developed from analog information and combined with a vertical scan signal. This combination of vertical signals is utilized to effect alterations in vertical scanning of a cathode ray tube of a flying spot scanner system such that tracking of a continuously moving film through a film scanning zone is achieved. Moreover, it should be clear that any one of the numerous techniques for developing ramp signals in the form of analog information is equally applicable and appropriate to the present system.

While there has been shown and described what is at present considered the preferred embodiments of the invention, it will be obvious to those skilled in the art that various changes and modifications may be made therein without departing from the invention as defined by the appended claims.

I claim:

1. In a system for developing a composite color television signal from a film of film frames continuously advanced through a film scanning zone of a flying spot scanner system wherein signals representative of film images are synchronized, encoded, and transmitted, apparatus for effecting modulation of vertical film scanning in synchronization with vertical color television signals comprising:
   - vertical scan means providing vertical color television scanning signals;
   - film frame detector means associated with said continuously advancing film of film frames and providing a signal representative of the positional location of a film frame in said film scanning zone; and
   - vertical scan modification signal development means including switching means coupled to said vertical scan and film frame detector means, gating means coupled to said switching and film frame detector means, and dual ramp signal development means coupled to said gating means whereby said dual ramp signals vary at a rate substantially equal to the rate of film frame advancement through said film scanning zone and are selectively switched in accordance with the positional location of a film frame in said film scanning zone.

2. The apparatus of claim 1 wherein said switching means is of a form to effect switching of said ramp signals in response to signals from said film frame detector means and said vertical scan means whereby said vertical scan modification signal and said vertical scan signal have substantially identical periods of retrace.

3. The apparatus of claim 1 wherein said gating means includes a first gating means coupling said switching means and said film frame detector means to said dual ramp signal development means and a second gating means coupled to said switching means and film frame detector means and coupling said dual ramp signal development means to a signal combining network whereby said switching means selectively initiates said dual ramp signals and selectively switches application of said dual ramp signals to said signal combining network.

4. The apparatus of claim 1 wherein said dual ramp signal development means provide signals in the form of analog information.

5. Composite color television signal development apparatus comprising:
   - sync pulse signal generating means;
   - flying spot scanner means including a scanner tube, means for continuously advancing a film of film frames through a film scanning zone, and signal processing means providing a signal representative of image information on said film;

horizontal and vertical deflection means coupled to said sync pulse signal generating means;

encoder means coupled to said sync pulse signal generating means and said signal processing means for providing synchronized information derived from said film;

transmitter means coupling said encoder means to an antenna for radiating a composite color television signal;

film frame detector means coupled to said means for continuously advancing a film of film frames and providing a signal representative of location of a film frame in said film scanning zone;

vertical scan modification signal development means including a switching means and a pair of ramp signal development means coupled to said vertical deflection and said film frame detector means and selectively providing a ramp signal in the form of analog information derived from said pair of ramp signal development means; and signal combining network means coupled to said vertical deflection and said vertical scan modification signal development means and providing a combined vertical scan and vertical scan modification signal for application to said scanner tube to modulate vertical scanning in accordance with film movement.

6. The apparatus of claim 5 wherein said vertical scan modification signal development means includes a first gating means for selecting and initiating ramp signal development by said dual ramp signal development means and a second gating means responsive to said switching means for selecting and applying a ramp signal developed by one of said dual ramp signal development means.

7. The apparatus of claim 5 wherein said switching means responds to signals from said film frame detector means and said vertical deflection means to effect switching of said dual ramp signal development means in a manner such that the retrace period of signals of said vertical deflection means and said vertical scan modification signal development means are substantially identical.

8. The apparatus of claim 5 wherein signals provided by said dual ramp signal development means have a magnitude varying at a rate substantially equal to the advancement rate of a film frame through said film scanning zone of said flying spot scanner means.

* * * * *